Nov. 4, 1941.                M. ROSENTHAL                    2,261,631
                              CONTROL DEVICE
                           Filed April 15, 1938            2 Sheets-Sheet 1

Morris Rosenthal
INVENTOR.
BY Clarence E. Threedy
HIS ATTORNEY.

Nov. 4, 1941.  M. ROSENTHAL  2,261,631
CONTROL DEVICE
Filed April 15, 1938  2 Sheets-Sheet 2

Morris Rosenthal
INVENTOR.
BY Clarence E. Threedy
HIS ATTORNEY.

Patented Nov. 4, 1941

2,261,631

UNITED STATES PATENT OFFICE 2,261,631

CONTROL DEVICE

Morris Rosenthal, Chicago, Ill.

Application April 15, 1938, Serial No. 202,283

15 Claims. (Cl. 38—9)

This invention relates broadly to conveying mechanism, and more particularly to automatic stop means for use with conveyors of the type employed particularly in laundry machines such as ironers and the like.

The invention is of general application in the field of conveyors but is particularly adapted for use with laundry machines of the type characterized, one of the principal objects being the provision of means for stopping an ironing machine automatically after each load or batch has gone through, so as to avoid any possibility of confusion of goods and also to conserve the operator's time and energy.

Viewed from another aspect, it is an important object of the invention to provide an automatic conveyor stop for use with laundry ironing machines of the type having a continuous conveyor web or belt upon which segregated batches of laundry are fed, the invention including control mechanism arranged to stop the conveyor and operated by a marker in the nature of a piece of flexible goods carrying means cooperable with the control, the marker being fed into the machine before the first article or articles of a particular batch are fed into the conveyor, the marker effecting a stopping of the machine automatically as soon as it reaches the control.

Another object is the provision of a marker provided with means for receiving an identification element identifying the batch of goods which it precedes.

Still another object is the provision of automatic control means for machinery including a conveyor, said control means including a member moved by the conveyor relative to the control and of a character adapted to affect the control, although other articles moved by the conveyor will not affect the control.

Other novel aspects and objects of the invention reside in certain details of construction as well as the combination and arrangement of parts hereinafter to be described in view of the drawings, in which:

Fig. 9 is a fragmentary side section through the line switch solenoid, as seen along line 9—9 of Fig. 8; while

As heretofore stated, the invention is generally applicable to conveyors and particularly suited for use with the conveyor mechanism employed in laundry ironing machines and the like.

Figure 1:
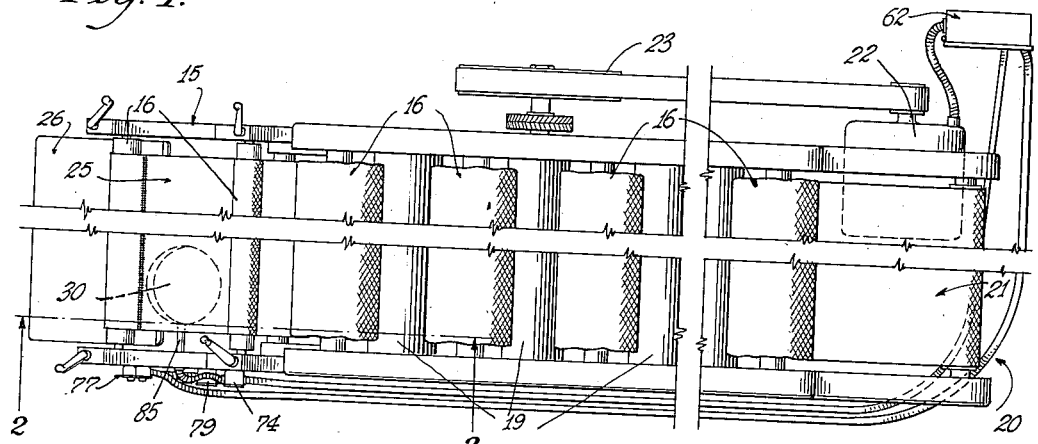
Fig. 1 is a top plan view of a preferred embodiment of the invention in an ironing machine.

In the illustrative embodiment of Fig. 1, there is shown an ironing machine including a frame structure 15 comprising spaced members between which are extended a plurality of rollers 16 (see also Fig. 2) over which is trained a conveyor belt or webbing 17 which winds its way over a plurality of idlers or floating rollers 18 variously distributed in the machine, as well as the plurality of rollers 16 and a number of stationary cylindrical irons 19.

One end 20 of the machine constitutes the feed end and includes a substantially horizontal section 21 of conveyor webbing designated as the feeding table and upon which an attendant places articles to be ironed. The system of rollers is driven by means such as a motor 22 connected through a belt drive 23 and a series of gears (not shown) driven thereby in such manner that the progress of the conveyor webbing is from right to left (Figs. 1 and 2) so as to carry the rough wash from the feeding table 21 at the feed or receiving end of the machine, through the system of rollers and conveyor webbing, over and around the several irons 19, and up an inclined section of conveyor webbing 25 (Fig. 2 particularly) onto a discharge table 26 at the far end of the machine where the ironed articles are collected by an attendant and disposed in segregated bundles or groups each constituting a particular batch of wash.

A preferred form of the control device includes a housing 31 formed preferably from a non-ferrous metal and provided interiorly with an insulating base 32 upon which are mounted a pair of spaced stanchions 33 having opposite pins 34 constituting trunnions between which is pivotally mounted a movable control element 35 in the form of a horseshoe magnet, the stanchions 33 being fixed to the base 32 as at 36.

Figure 4:
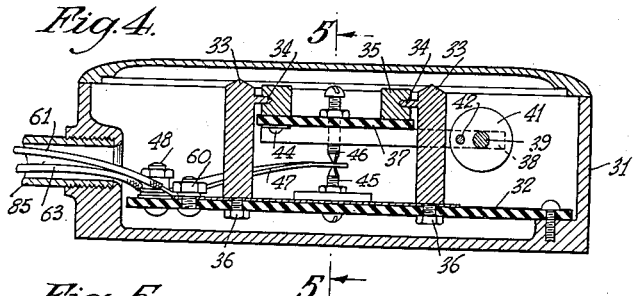
Fig. 4 is a vertical section through the control unit taken along line 4—4 of Fig. 3.
Figure 5:
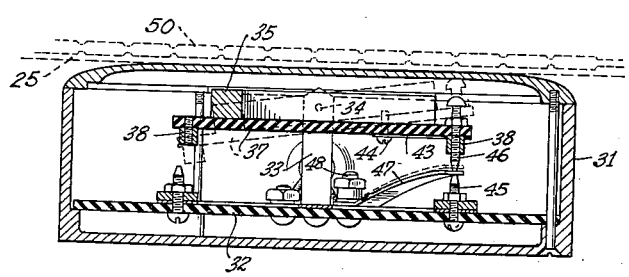
Fig. 5 is another vertical section through the control, illustrating its operation and taken along line 5—5 of Fig. 4.
Figure 9:
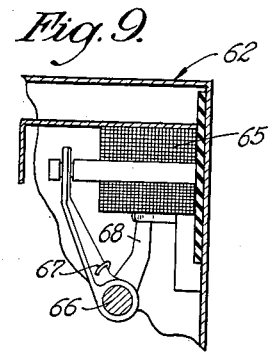

Attached to the under side of the horseshoe magnet by means such as the screws 44 (Figs. 4 and 5 also) is a small panel 37 of insulating material, such as Bakelite or the like, extending in a plane parallel to that of the magnet and having a pair of spaced arms 38 extended laterally from one side thereof and constituting a support for an adjustment means. In the present instance, the adjustment means includes a threaded rod 39 having reduced spindle portions 40 at its opposite ends and seated for free rotation in corresponding arms 38. A weighted rider 41 having an interiorly threaded bore engaging the threading on the shaft 39, rides on the latter responsive to turning movement thereof by application of torque at either of its spindle ends 40, the latter being provided with slots into which a screw driver or the like may be fitted for this purpose. The rider 41 is provided with an eccentric opening through which a guide rod 42 extends, the latter being seated in the arms 38 near its ends and serving to prevent rotation of the rider when the threaded shaft 39 is turned.

A stationary contact 45 is mounted on the base 32 (Figs. 4 and 5) beneath the insulated block 37 at the pole end of the magnet and substantially between the pole pieces thereof. On the insulated block 37, which moves with the magnet, there is a companion contact 46 overlying the first-mentioned contact 45, and extending between these contacts is a flexible follower contact 47 secured at its far end by means 48 to the base 32 and normally biased so that its free end presses upwardly against the companion or top contact 46 with a tendency to pivot the magnet assembly upwardly on its trunnions, in which position the upper contact 46 as well as the follower contact 47 are disposed out of operative engagement with the stationary lower contact 45, this position constituting an open-circuit or off position.

By proper placement of the threaded rider or weight 41 in the manner heretofore described, the magnet assembly may be counterbalanced so as to tilt the pole ends downwardly to cause the movable or upper contact 46 to urge the follower contact 47 against the lower contact 45 in closed-circuit condition for energization of the driving motor 22 for the ironer in a manner which will be described in detail in conjunction with the circuit diagram of Fig. 10. The follower contact 47 prevents chattering and arcing as well as false operation.

A preferred form of marker or automatic stopping means for use with the aforesaid control device consists of a pad-like fabric and metal marker 50 (Figs. 6 and 7) of a width several times that of the control unit 30 and preferably of less width than the conveyor web. The marker 50 may be of canvas cut in the rectangular form shown and including top and bottom portions 51 and 52 between which are arranged a plurality of paramagnetic bars 53 extended laterally with relation to the length of the marker and spaced apart a suitable distance to permit stitching the top and bottom folds of the marker together between adjacent bars 53.

At the end of the marker opposite the paramagnetic means, there is formed a pocket 54 adapted to receive an identification card or the like for purposes of identifying a batch of goods which is following or preceding the marker in the conveyor or ironer. It will be apparent that the bar-like formation of the paramagnetic bars or members 53 permits flexing the marker in a direction lateral to its length. However, the individual paramagnetic bars, members, or control elements 53 may take the form of a plurality of fragments arranged end to end in their respective pockets across the marker so as to make the marker yieldable both in the direction of its width and length. Such an arrangement is referred to more particularly in my copending application, Serial No. 202,284, filed of even date herewith and constituting a continuation in part of the present disclosure.

Also, the magnetic insert may be in the form of relatively thin sheet iron or a plurality of thin sheets or laminations, or if desired, iron filings may be secured in the marker to provide the magnetically attractable actuating means for the control.

The upper or movable contact 46 on the magnet assembly is connected by a strap 43 and a screw 44 threaded into the magnet to the stanchions 33, one of the same having a binding post 60 to which is connected a conductor 61 leading to the motor control means or line switch. The movable or follower contact 47 as well as the stationary contact 45 are connected in common at a binding post 48 on the base 32 with a conductor 63 also leading to the motor control or line switch.

Figure 8:
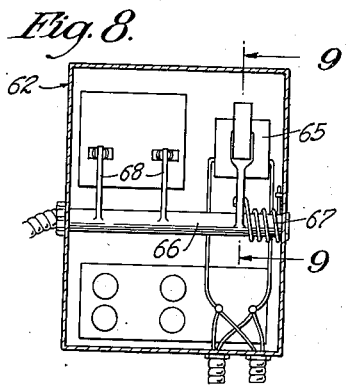
Fig. 8 is a detail of the line switch.

The control means for the driving motor 22 may be of any form, such for example as the electrically operated switch 62 of Fig. 8 which includes a solenoid 65 having a plunger arranged to rock a switch arm 66 against the tension of a spring 67 to move the contact finger 68 into and out of circuit-closing position to energize the motor 22.

The line switch solenoid 65 is connected by a conductor 70 with one side of a transformer secondary 71 (Fig. 10), the opposite side of the solenoid being connected by a conductor 72 to the movable contact 73 of a selecting switch 74 arranged on the side of the ironing machine conveniently close to the discharge table (Fig. 1). One of the stationary contacts 75 of the selecting switch is connected by the conductor 61 to the stanchion 33 of the magnet assembly, and thus to the movable upper contact 46. The return circuit through the movable contact 46 is completed through the follower contact 47 (in common with the stationary contact 45) via conductor 63 back to the opposite side of the transformer secondary 71. This latter circuit conditions the apparatus for automatic control. For selective manual control, the selective switch arm 73 is moved to a stationary contact 76 thereof connected through a manual switch 77 with conductor 63 to the opposite side of the transformer secondary. Thus, when the movable selective switch arm 73 is engaged with the contact 76 thereof, the switch 77 may be manipulated to energize and deenergize the solenoid 65 and hence start and stop the motor 22 by corresponding actuation of the switch means 68.

The primary 78 of the transformer is connected to the line through an emergency switch 79 also arranged on the side of the machine near the selecting switch 74 so that regardless of which control is in circuit with the motor, the attendant will always have positive control over the machine.

Figure 10:
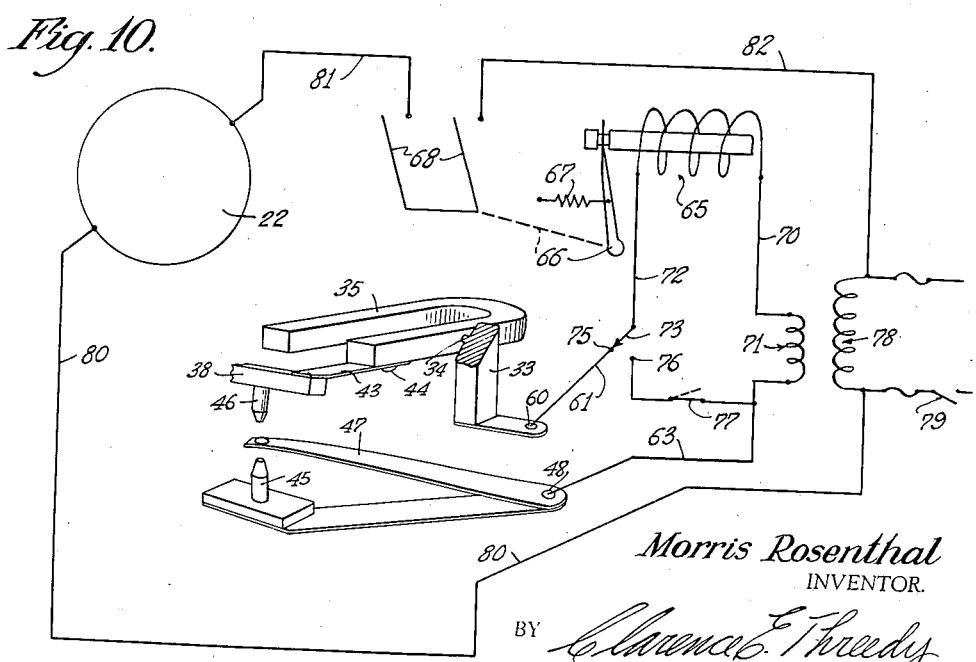
Fig. 10 is a circuit diagram.

As illustrated in Fig. 10, the power circuit for the motor leads from one side of the line in common with the transformer primary via conductor 80 to one side of the motor 22, thence via conductor 81 through the switch contact 68 and via conductor 82 back to the line side of the transformer primary.

In operation, it may be assumed that the line switch 79 is closed, and that the selecting switch arm 73 is connected with the contact 75 for automatic operation. The counterbalancing weight 41 on the magnet carriage or assembly having been adjusted to tilt the magnet down normally, the movable upper contact 46 will bear down against the follower contact 47, urging the latter against the stationary stop contact 45 in common therewith, thus closing a circuit through the switch solenoid 65 from one side of the transformer secondary 71 via conductor 70, through the solenoid winding via conductor 72, switch 73—75, conductor 61, stanchion 33, strap 43, contacts 46 and 47, returning via conductor 63 to the opposite side of the transformer secondary. This will pull up the armature of the solenoid and close the line switch 68, starting the motor 22 and the conveyor mechanism in the ironing machine.

The attendant will feed articles from the horizontal portion 21 of the webbing through the ironer, such articles finally passing over the end portion 25 of the conveyor system and onto the discharge table 26, articles also variously passing above the control device 30 which is inserted between the upper and lower turns 25 and 25' respectively of the discharge end of the webbing, with the upper portion of the control device 30 (Fig. 2, particularly) close to the under side of the top turn of the webbing 25. The housing 31 for the control device may be secured in position by any suitable means, preferably the conduit 85, suitably secured to a portion of the machine frame or casting 15.

Figure 2:
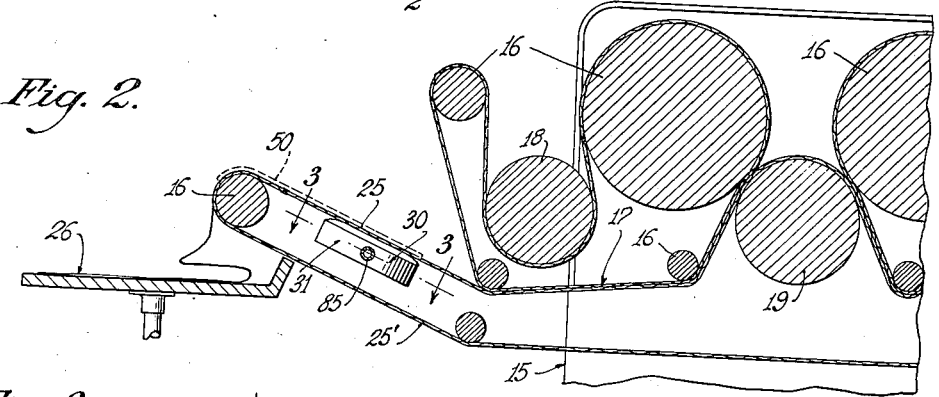
Fig. 2 is a fragmentary schematic section taken along line 2—2 of Fig. 1.
Figure 3:
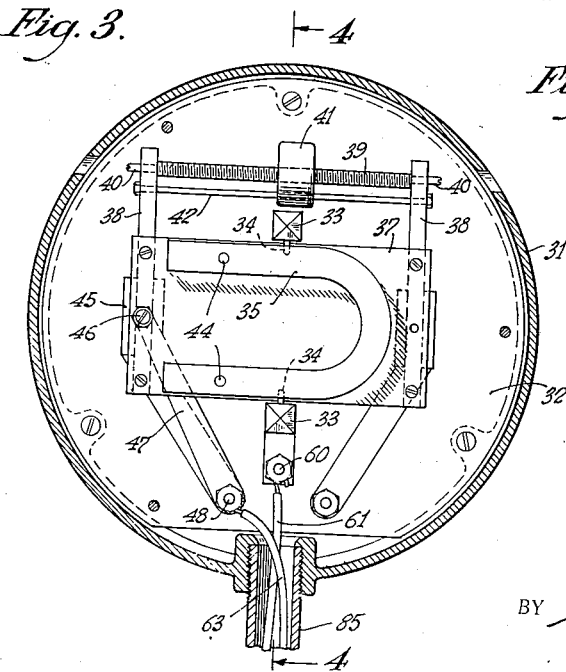
Fig. 3 is a section through the control device, showing the control elements in plan, as seen along line 3—3 of Fig. 2.

With the control device disposed as seen in Fig. 2, and the counterbalance 41 properly adjusted, the switch contacts 46 and 47 will be closed, corresponding to a lowered position of the magnet 35 and its pole pieces, the latter being, however, arranged as close to the top of the casing 31 as possible to minimize the distance between the pole pieces and the webbing portion 25, while at the same time permitting freedom of pivotal movement of the magnet.

Figure 6:
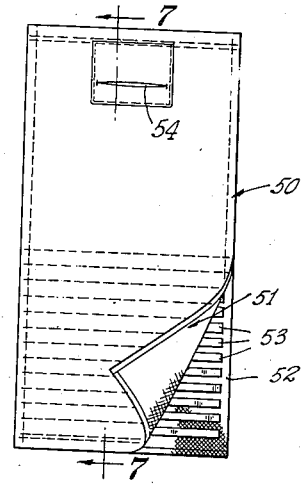
Fig. 6 is a top plan view of a form of marker to be used with the control.
Figure 7:
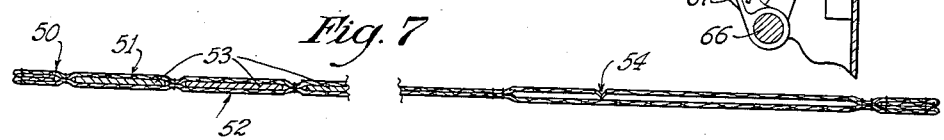
Fig. 7 is an enlarged vertical section through the marker, taken along line 7—7 of Fig. 6.

When the last articles of a particular batch of goods have been started through the machine from the table 21, the attendant at that end of the machine will place a marker such as shown in Fig. 6, for example, on the table to precede the next batch and indicate that the previous batch is finished, the attendant or someone else having previously prepared an indicia card or some kind of identification element for insertion in the pocket 54 of the marker prior to the introduction of the marker in the machine. The marker is fed into the machine head first, that is to say, with the pocket 54 in advance and the long axis of the marker 50 parallel to the long axis of the machine, so that the control operating means or bars 53 trail the pocket section 54. Machines such as that illustrated in Fig. 1 generally have a considerable width. However, it is not necessary that the marker 50 be of corresponding width, the proportion shown in the drawings being suitable for most purposes, attention being called to the fact that the paramagnetic control elements 53 in the marker are preferably several times as long as the control device 30 is wide, so as to permit a limited variation of movement of the marker through the machine.

After the last articles of the particular batch issue from the ironer toward the discharge table 26, the head portion of the marker will be close behind with the pocket portion 54 well exposed to the attendant at the discharge end of the machine before the control elements 53 can influence the control device 30. When a sufficient number of control elements or bars 53 are positioned above the control device, the magnet 35 will tilt upwardly as a result of magnetic attraction between the pole pieces and the paramagnetic material in the marker, so that the contact 46 will be drawn away from the follower contact 47, breaking the previously described circuit through the solenoid 65 and hence releasing the motor line switch and stopping the machine, with the trailing portions of the marker 50 resting on the upwardly inclined discharge part of the webbing 25, as illustrated in Fig. 2, which holds contacts 46—47 apart and the ironer stopped.

When the attendant at the discharge end of the machine has suitably disposed of the preceding batch, he may effect an automatic starting of the machine by simply removing the marker 50 from the machine, thus causing the magnet 35 to tilt downwardly into its normal position to again close the circuit through the motor switch solenoid 65 in the manner heretofore described. The marker 50 is ordinarily returned to the feeding end of the machine by a trolley system or any other means, there usually being a plurality of the markers 50 so that there is always a supply on hand at the feeding end of the machine.

Manual control of the machine may be exercised during its ordinary operation for emergency or other purposes, by operation of the line switch 79 on the side of the machine, or, if desired, the selecting switch 73—74 may be manipulated to transfer the control of the solenoid circuit from the automatic device 30 to the switch 77.

It will thus appear that I have provided a simple control means applicable to a wide range of conveyor systems other than the particular one shown in conjunction with a laundry ironing machine, and it is to be understood that the invention extends to all such other applications.

Likewise, while I have shown a simple form of magnetic control means in the form of a horseshoe permanent magnet 35, various forms of electromagnet may be arranged to take the place of the simpler permanent magnet.

For example, an ordinary horseshoe core, the shape of the magnet 35, may be supplied with a winding connected to an energizing circuit through the stanchions 33 and suitably insulated bearing or stanchion contacts, the other circuit connections remaining substantially the same.

All such modifications, rearrangements and changes in form, location, or mode of operation of the illustrative embodiment of the invention are to be included within the scope of the appended claims.

Having thus described my invention, what I claim as new and desire to protect by Letters Patent is:

1. In combination, a conveyor, electrical drive means for said conveyor and automatic control means including a switch in circuit with said drive means, a movable magnetic element normally closing said switch and arranged close to said conveyor and articles moved thereby, together with means in the form of a marker having a paramagnetic substance therein and fed into said conveyor for movement thereby relative to said magnetic element, whereby to effect movement of the same to actuate said switch to control said drive means.

2. In combination, a conveyor including a conveying web and electrical drive means therefor, control means including a switch arranged in circuit with said drive means, a movable magnetic element constructed and arranged normally to close said switch and placed close to said web and articles moved thereby, and a control marker in the form of a member provided with a paramagnetic substance and adapted to be placed upon said conveyor web for movement thereby close to said control device and the magnetic element thereof, whereby to effect movement of the latter to actuate said switch for the purpose of controlling said drive means.

3. In combination, a conveyor including a conveyor web and power drive means therefor, said conveyor having a feeding end and a discharge end, and control means including a control element operably associated with said drive means, a movable magnetic element positioned close to said web near said discharge end and in such manner as to be close to articles conveyed by the web, said magnetic element being arranged to actuate said control element, and control operating means in the form of a substantially flexible marker having a paramagnetic substance therein and adapted to be placed on said conveyor for movement from the feed to the discharge end thereof past said control device, said paramagnetic substance effecting movement of said magnetic element and corresponding operation of said control element when the marker moves relative to said control device.

4. In a conveyor including a conveying web and electrical drive means therefor, control mechanism including a switch arranged in circuit with said drive means, a magnetic element arranged for pivotal movement to operate said switch, means supporting said magnetic element close to said web and articles moved thereby and disposing said magnetic element for movement about an axis substantially parallel to said web, and means adapted to be placed on said conveyor to actuate said control device and including a substantially flat marker constructed of a flexible material and arranged to carry with it a paramagnetic substance for movement thereby close to said magnetic element to effect pivotal movement of the latter for actuation of said switch and control of said drive means when said marker is moved by the conveyor toward and close to said control mechanism.

5. In combination, mechanism including a conveyor having a conveying web and electric drive means for training said web about a circuit from a feeding end toward a discharge end, and control means including a switch arranged in circuit with said drive means, a pivoted magnetic element arranged to actuate said switch when moved from a normal position, and means supporting said magnetic element closely beneath an article-bearing portion of said web near said discharge end, and means optionally carried by said conveyor for operating said control, said means including a marker including a magnetically attractable substance and adapted to be placed upon said conveyor for movement thereby from said feed end toward said discharge end and relative to said magnetic element, whereby to effect movement of the latter to actuate said switch.

6. The combination, with a conveyor mechanism of the type including a continuous conveyor web and roller means cooperable therewith for feeding articles from a feeding end toward a discharge end of the conveyor, of control means including a switch and drive means operably controlled thereby and arranged to drive said conveyor, a movable magnetic member arranged to actuate said switch and means mounting said magnetic member close to an article-bearing portion of said web near said discharge end, and control actuating means in the form of a substantially flat marker having magnetically attractable means arranged therein in a manner to render said marker flexible, said marker being placed upon said conveyor for movement thereby from said feeding end toward said discharge end and close to said magnetic element to effect movement of the latter and actuate said switch.

7. In combination with a laundry machine of the type including a conveying web, roller means cooperable therewith and electrical drive means therefor, a control device including a switch in circuit with said drive means, a pivoted magnetic element arranged to actuate said switch and means supporting said element close to said web for actuation by an article carried thereon, and means for actuating said control device in the form of a marker of substantially flat form and having a magnetically attractable substance secured thereto, said marker being placed upon said conveyor and of a shape and flexibility adequate to permit free movement of the same relative to said roller means such that the marker may be moved by the conveyor relative to said magnetic element for movement of the latter by magnetic attraction with the magnetically attractable substance in the marker whereby to effect actuation of said switch, together with manually operable switch means arranged in circuit with said first-mentioned switch for optional manual control of said drive means.

8. In a device of the class described including a conveying web, automatic control means including a switch, a pivoted magnet arranged to actuate said switch, means supporting said magnet for pivotal movement toward and away from the plane of said web and means for actuating said control means including a marker adapted to be placed upon said web and including a magnetically attractable substance carried by said web close to said magnetic member to effect pivotal movement of the latter as a result of magnetic attraction whereby to actuate said switch, and drive means operably controlled by said switch and operatively associated with said conveyor.

9. In a device of the class described including a conveyor and electrical drive means therefor, automatic control means including a switch connected with said drive means, a pivoted magnetic member normally closing said switch when in a normally pivoted position and pivotable away from said normal position to open said switch, said magnetic member being arranged close to said conveyor and articles carried thereby, and means for actuating said control means including a marker provided with a magnetically attractable substance, said marker being placed upon said conveyor for movement thereby over said control means whereby to effect pivotal movement of the magnetic member from said normal position as a result of magnetic attraction with said magnetically attractable substance of the marker whereby to open said switch and stop said drive means, said magnetic member being arranged to return automatically to said normal position when said marker is removed from the neighborhood thereof.

10. In a device of the class described including a conveyor and electrical drive means therefor, automatic control means including a switch connected with said drive means, a pivoted magnetic member normally closing said switch when in a normally pivoted position and pivotable away from said normal position to open said switch, said magnetic member being arranged close to said conveyor and articles carried thereby, and means for actuating said control means including a marker provided with a magnetically attractable substance, said marker being placed upon said conveyor for movement thereby over said control means whereby to effect pivotal movement of the magnetic member from said normal position as a result of magnetic attraction with said magnetically attractable substance of the marker whereby to open said switch and stop said drive means, said magnetic member being arranged to return automatically to said normal position when said marker is removed from the neighborhood thereof, together with selectively operable manual switch means arranged in circuit with said first-mentioned switch and providing optional manual control of said drive means apart from said control means.

11. Automatic control mechanism for use with laundry machines of the type including electric drive means, a conveying web and roller means cooperable therewith, said control mechanism including a casing, a switch in said casing and operatively connected with said drive means, a movable magnetic element arranged in said casing and normally disposed in a position to close said switch, said casing being mounted close to said conveying web and articles moved thereby, and means for actuating said control mechanism including a substantially flat flexible marker having a magnetically attractable substance movable therewith and effective upon movement relative to said magnetic element to move the latter out of said normal position to open said switch and stop said drive means.

12. Automatic control means for use with ironing machines of the type including a conveying web and roller means cooperably driven therewith and electric drive means for said web and roller means, said control means including a switch for connection with said drive means, a pivoted magnetic member and adjustable means for counterbalancing said member for movement into a normal position, said magnetic member being constructed and arranged to close said switch when in said normal position, means mounting said magnetic member close to said web and articles moved thereby, and means adapted to be placed upon said web for actuating said control means, said means including a substantially flat marker of a size suitable for movement between said roller means and said web and including magnetically attractable means movable therewith relative to said magnetic member to effect pivotal movement of the latter out of said normal position to actuate said switch and stop said drive means.

13. Automatic control means for use with ironing machines of the type including a conveying web and roller means cooperably driven therewith and electric drive means for said web and roller means, said control means including a switch for connection with said drive means, a pivoted magnetic member and adjustable means for counterbalancing said member for movement into a normal position, said magnetic member being constructed and arranged to close said switch when in said normal position, means mounting said magnetic member close to said web and articles moved thereby, and means adapted to be placed upon said web for actuating said control means, said means including a substantially flat marker of a size suitable for movement between said roller means and said web and including magnetically attractable means movable therewith relative to said magnetic member to effect pivotal movement of the later out of said normal position to actuate said switch and stop said drive means, together with selectively operable manual switch means arranged in circuit with said drive means for control of the latter independently of said automatic control means.

14. In a device of the class described, automatic switch means including a housing, a stationary contact in said housing, a magnetic member mounted in said housing for pivotal movement, a movable contact arranged for movement by said magnetic member, adjustable counterbalancing means for biasing said magnetic member into a predetermined normal position with said contacts in operative engagement, said housing being adapted for placement relative to the path of movement of a magnetically attractable substance whereby to effect movement of said magnetic member from said normal position to separate said contacts, said contacts being adapted for connection in a controlled circuit.

15. In combination, control mechanism including a casing, a switch in said casing, a magnetic member pivotally mounted in said casing and provided with adjustable counterbalancing means normally pivoting said magnetic member into position to close said switch, and actuating means for said control mechanism including a member constructed and arranged for movement relative to said casing and including a relatively magnetically attractable substance effective as a result of magnetic atraction between the same and said magnetic member to cause movement of the latter out of said normal position to actuate said switch.

MORRIS ROSENTHAL.